United States Patent
Beyer

(10) Patent No.: US 6,341,686 B1
(45) Date of Patent: Jan. 29, 2002

(54) CONVEYING DEVICE WITH A TRANSFER CONVEYOR FOR TRANSFERRING CONVEYED ITEM CARRIERS FROM A SUSPENDED CONVEYOR

(75) Inventor: Rolf Peter Beyer, Buchloe (DE)

(73) Assignee: WF Logistik GmbH, Lansberg (DE)

( * ) Notice: Subject to any disclaimer, the term of this patent is extended or adjusted under 35 U.S.C. 154(b) by 0 days.

(21) Appl. No.: 09/581,533
(22) PCT Filed: Jan. 8, 1999
(86) PCT No.: PCT/EP99/00081
§ 371 Date: Jul. 7, 2000
§ 102(e) Date: Jul. 7, 2000
(87) PCT Pub. No.: WO99/35065
PCT Pub. Date: Jul. 15, 1999

(30) Foreign Application Priority Data
Jan. 9, 1998 (DE) .......................................... 198 00 630

(51) Int. Cl.[7] .............................................. B65G 17/32
(52) U.S. Cl. ................ 198/680; 198/465.4; 198/678.1; 198/687.1
(58) Field of Search ........................... 198/465.4, 678.1, 198/680, 687.1

(56) References Cited

U.S. PATENT DOCUMENTS

| | | | |
|---|---|---|---|
| 2,816,643 A | * 12/1957 | Klamp | ................... 198/678.1 |
| 2,845,034 A | 7/1958 | Harrison | |
| 4,838,036 A | * 6/1989 | Norrie | ............................. 62/63 |
| 5,404,992 A | 4/1995 | Robu et al. | |
| 5,433,154 A | * 7/1995 | Chwalik et al. | ......... 104/172.4 |
| 5,697,301 A | * 12/1997 | Sporer | ........................ 104/96 |

FOREIGN PATENT DOCUMENTS

| | | |
|---|---|---|
| DE | 92 10 549 | 1/1994 |
| DE | 94 02 990 | 6/1995 |
| DE | 295 19 284 | 1/1996 |
| DE | 196 24 503 | 1/1997 |
| GB | 2 243 816 | 11/1991 |

* cited by examiner

Primary Examiner—Christopher P. Ellis
Assistant Examiner—Khoi H. Tran
(74) Attorney, Agent, or Firm—Arent Fox Kintner Plotkin & Kahn, PLLC

(57) ABSTRACT

The invention proposes a conveying apparatus with a three-dimensionally movable receiving conveyor for receiving conveyable-article carriers (3) from a suspended conveyor in which the conveyable-article carriers (3) are guided on a running-roller guide profile for movement along a first conveying section (5) and are supported in a suspended manner on own running rollers (29). The receiving conveyor has a series of receiving elements (17) which are arranged one after the other on a drive chain (15), are moved by the chain (15) along a second conveying section (9) and are intended for the conveyable-article carriers (3), it being the case that, at a receiving location, the conveying sections (5, 9) run closely adjacent, and the receiving elements (17) are guided such that they execute a lifting movement in order for conveyable-article carriers (3), which are fed to the receiving location (49) from the suspended conveying apparatus in each case, to be engaged at engagement means (29), which project from said conveyable-article carriers, for the purpose of being carried along the second conveying section (9).

22 Claims, 5 Drawing Sheets

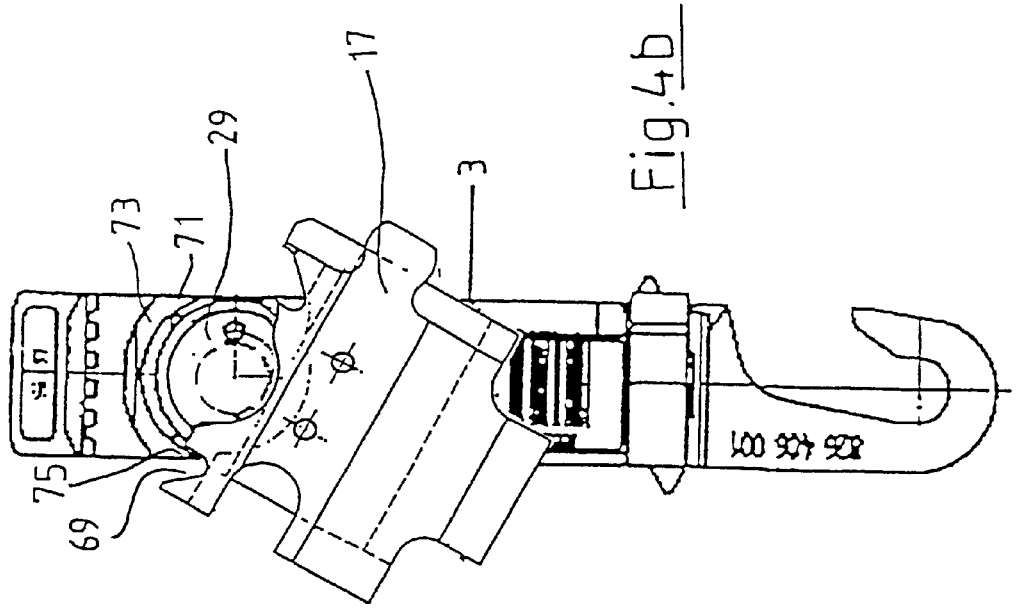
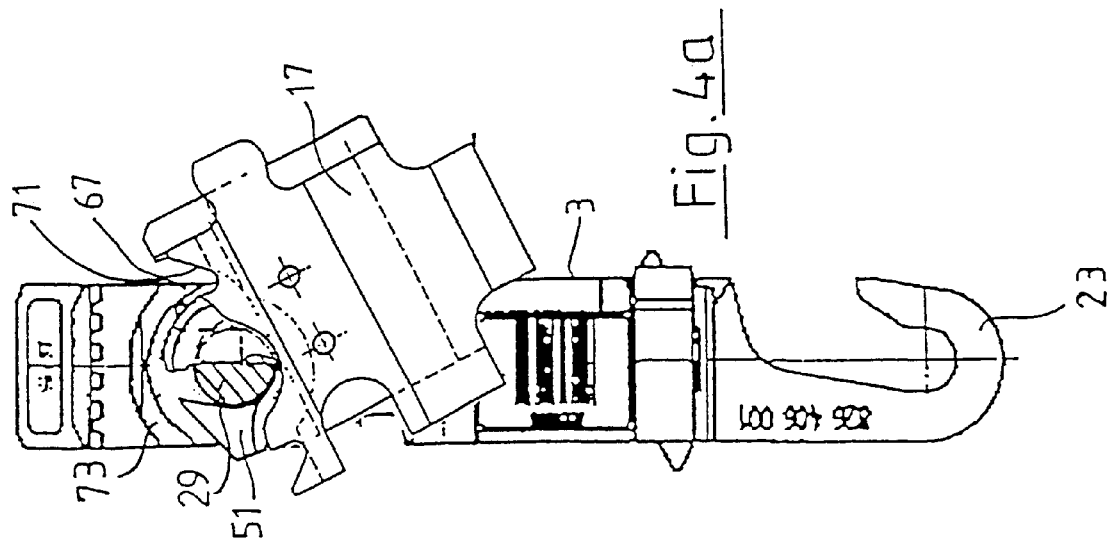

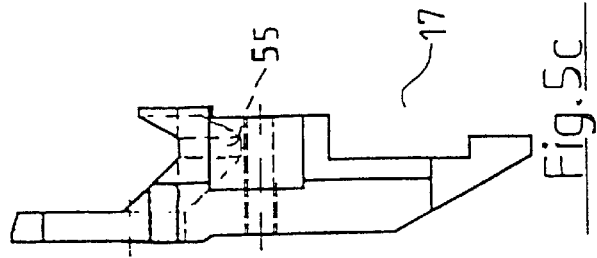
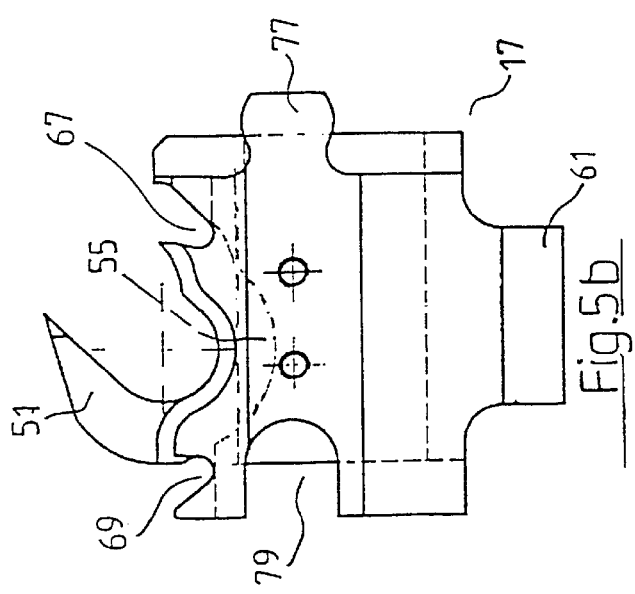
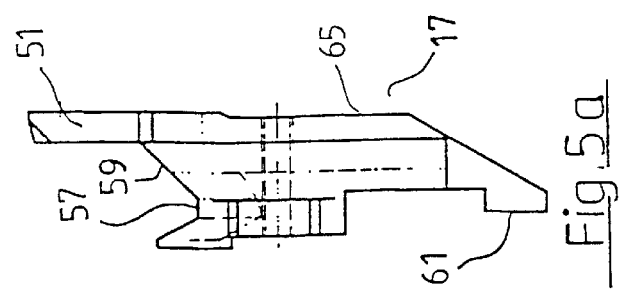
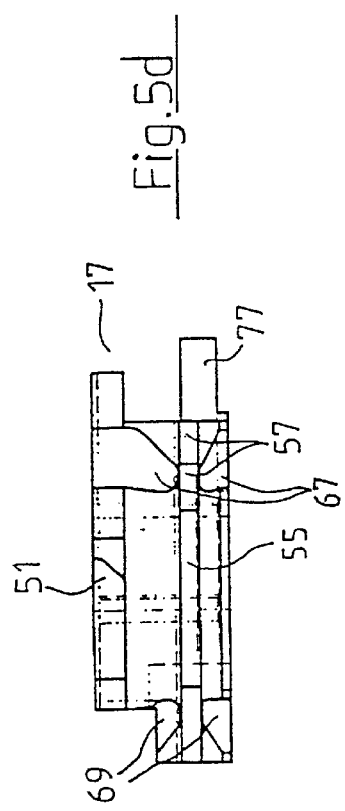

CONVEYING DEVICE WITH A TRANSFER CONVEYOR FOR TRANSFERRING CONVEYED ITEM CARRIERS FROM A SUSPENDED CONVEYOR

BRIEF SUMMARY OF THE INVENTION

The invention relates to a conveying apparatus and in particular to a receiving conveyor for receiving conveyable-article carriers from a suspended conveyor in which the conveyable-article carriers are guided on a running-roller guide profile for movement along a first conveying section and are supported in a suspended manner on own running rollers.

The object of the invention is to provide a conveying apparatus with a receiving conveyor of the abovementioned type which, while being of straightforward construction, functions reliably, allows a high and, in particular, continuous conveying capacity, may be of three-dimensionally movable design and, for the purpose of realizing the function of receiving conveyable-article carriers from a conventional suspended conveyor, does not require the suspended conveyor to be subjected any adaptation measures or alteration.

In order to achieve this object, the invention proposes that the receiving conveyor have a series of receiving elements which are arranged one after the other on a common drawing means, are moved along a second conveying section by the drawing means and are intended for the conveyable-article carriers, it being the case that, at a receiving location, the first conveying section and the second conveying section run closely adjacent in a laterally offset manner, and the receiving elements are guided such that, at the receiving location, they execute a lifting movement relative to the running-roller guide profile of the suspended conveying apparatus in order for conveyable-article carriers, which are fed to the receiving location along the first conveying section from the suspended conveying apparatus in each case, to be engaged at engagement means, which project from said conveyable-article carriers, for the purpose of being carried along the second conveying section, and for said conveyable-article carriers to be lifted off from the guide profile of the suspended conveying apparatus.

There are various posible ways of guiding the receiving elements, as they pass the receiving location, such that their movement has a lifting component. One possibility is that the drawing means pivots the receiving elements upwards about the longitudinal axis of the drawing means in order thus for the conveyable-article carriers to be lifted out of the running-roller guide profile of the suspended conveying apparatus, with the conveyable-article carriers being engaged at the same time.

According to a preferred embodiment, however, at the receiving location, the second conveying section, i.e. the conveying section of the receiving conveyor, has an upward slope with an acute slope angle relative to the usually horizontally running, first conveying section, with the result that the receiving elements, during the movement along the upward slope, can grip beneath the engagement means of the conveyable-article carriers, which are fed one after the other to the receiving location on the first conveying section. For this purpose, it is proposed that the receiving elements each have a hook portion by means of which they automatically grip behind and beneath the engagement means of a conveyable-article carrier respectively located at the receiving location as said receiving elements move along the upward slope of the second conveying section, in order to lift the conveyable-article carrier off from the running roller guide profile of the suspended conveying apparatus.

The receiving elements may be guided along the second conveying section such that, immediately after passing the receiving location, they increase not only the vertical distance from the first conveying section but also their lateral distance.

According to a particularly preferred embodiment, the receiving conveyor may receive and transport conveyable-article carriers of conventional construction. These are conveyable-article carriers which have a central carrier portion from which in each case one running roller of a running-roller pair projects on two mutually opposite sides, it being the case that a relevant conveyable-article carrier in the suspended conveying apparatus is suspended laterally on the running-roller guide profile in each case by one of the two running rollers and is guided on said running roller. A special feature within the context of the present invention, then, is that the other running roller serves as engagement means for the engagement by a relevant receiving element of the receiving conveyor. The receiving conveyor according to the invention thus does not require any adaptation or alteration measures, either in the case of a conventional suspended conveying apparatus for such conveyable-article carriers or in the case of conveyable-article carriers, in order to realize the function of receiving the conveyable-article carriers.

The abovementioned conveyable-article carriers may be, for example, so-called hanger carriers which have a hook at their bottom end. A clothes hanger with an item of clothing located thereon may be suspended on the hook. The conveying apparatus under consideration here is thus suitable, in particular, for use in the clothing industry, laundries, etc.

A further advantage can be seen in the fact that the receiving conveyor according to the invention can be used for transporting conveyable articles between different storeys or between different levels within one storey. For this purpose, the receiving elements may be configured such that they retain the conveyable-article carriers securely both during upward travel along any desired upward slopes and during downward travel along any desired downward inclines.

The drawing means is preferably a drive belt which is designed as an endless loop, is driven in circulation around two deflecting devices, is guided along the second conveying section and, on the loop periphery, has the receiving elements for the conveyable-article carriers in an endless series.

Although the drive belt may be a continuous steel belt, plastic belt or rubber belt, it is designed, according to a preferred embodiment, as a chain, in particular articulated chain, which is preferably guided in a chain-guide groove.

The chain can be driven for continuous movement, it being the case that the movement sequence of the receiving elements at the receiving location and the geometry and spacing of the receiving elements are coordinated with the conveying speed of the suspended conveyor such that each of the conveyable-article carriers fed to the receiving location on the suspended conveyor is engaged individually by a respective receiving element of the receiving conveyor for the purpose of being carried along the second conveying section. It is not necessary, for this purpose, for the conveyable-article carriers to be fed to the receiving location along the first conveying section cyclically or in a manner in which they are separated from one another. The conveyable-article carriers may be fed to the receiving location individually at regular or irregular intervals from one another or in groups of blocks. In each case, each conveyable-article carrier is received in a respective receiving element by the continuously driven receiving conveyor and is thus introduced into the second conveying section. A trial installation achieved a conveying speed of 0.5 m/s. With continuous feeding of the conveyable-article carriers to the receiving location, this corresponded to a conveying capacity of approximately 45,000 conveyable-article carriers per hour.

An interesting aspect is that the receiving conveyor may perform a diverter function. For this purpose, a development of the invention provides that the distance between the first conveying section and the second conveying section at the receiving location can be changed in a controlled manner, with the result that the conveyable-article carriers located on the first conveying section can pass the transition location, and remain on the first conveying section, without being influenced by the receiving elements, which have been moved out of reach, if the distance between the conveying sections at the transition location is increased by a certain value.

The receiving conveyor preferably has a receiving head which has one of the deflecting devices for the drawing means and which, in an active position, guides the receiving elements up to the first conveying section for the purpose of engaging conveyable-article carriers. According to a development of the invention, the receiving head can be moved, in particular pivoted, between the active position and a passive position relative to the suspended conveyor, it being the case that, in the passive position, it guides the receiving elements out of reach of the conveyable-article carriers moving on the first conveying section.

It is also proposed that, at a transfer location, the second conveying section, that is to say the conveying section of the receiving conveyor, runs closely adjacent in a laterally offset manner to a third conveying section, which, corresponding to the first conveying section, has a running-roller guide profile for the conveyable-article carriers, and that the receiving elements are guided such that, at the transfer location, they execute a lowering movement relative to the running-roller guide profile of the third conveying section in order for the conveyable-article carriers which are received from the first conveying section to be introduced into the running-roller guide profile of the third conveying section from above by way of their free running rollers, which project outward from the receiving elements in each case. The conveyable-article carriers are transferred automatically and in a manner which complements the manner in which they are received from the first conveying section. At the receiving location, the second conveying section preferably has a downward incline with an angle of inclination relative to the third conveying section, it being the case that the conveyable-article carriers, which are fed to the transfer location at the angle of inclination, are engaged at their free running rollers, which project outward from the receiving elements, by the running-roller guide profile of this third conveying section such that they are forcibly freed from the receiving elements and transferred to the third conveying section.

The receiving elements are preferably guided such that they are deflected laterally immediately after passing the transfer location, their distance from the third conveying section being increased in the process.

For the purpose of realizing a diverter function, it may be provided that the distance between the second conveying section and the third conveying section at the transfer location can be changed in a controlled manner, with the result that the conveyable-article carriers pass the transfer location, and remain on the second conveying section, without being affected by the running-roller guide profile of the third conveying section if the distance between the second conveying section and the third conveying section at the transfer location is increased to a certain value.

For the purpose of discharging the conveyable-article carriers to the third conveying section, the receiving conveyor may have a transfer head which guides the receiving elements up to the third conveying section and has a deflecting device for the drawing means.

For the purpose of realizing the diverter function, the transfer head can be moved, in particular pivoted, between its active position, in which it is advanced up to the third conveying section, and a passive position relative to the third conveying section, it being the case that, in the passive position, it guides the receiving elements out of reach of the third conveying section, with the result that the conveyable-article carriers can pass the transfer location, and remain on the second conveying section.

A particular advantage can be seen in that the second conveying section, that is to say the conveying section of the receiving conveyor, may run three-dimensionally with upward slopes, downward inclines and lateral curves, the conveyable-article carriers with or without conveyable articles being retained reliably on the receiving elements.

For this purpose, the receiving elements are preferably each provided with a pocket-like depression for receiving the relevant running roller of a conveyable-article carrier, with the pocket-like depression having a contour adapted to the shape of the running roller. The receiving elements preferably each have a receiving channel which introduces the running roller into the pocket-like depression as the relevant conveyable-article carrier is received, and also have, laterally in relation to the pocket-like depression, an upwardly projecting hook portion which is open in the forward direction and grips over a running roller of a picked-up conveyable-article carrier, said running roller being received in the pocket-like depression.

Such a geometry of the receiving elements allows the conveyable-article carriers to be received reliably and securely during continuous operation at high conveying speed.

Each receiving element supports a respectively received conveyable-article carrier at its running roller such that it could be pivoted about the running-roller axis, with the result that the conveyable-article carrier can be aligned vertically under the action of gravitational force when the receiving element, during movement along an upward slope or during movement along a downward incline of the second conveying section, is positioned obliquely relative to the vertical, it being the case that the receiving element has a first locking notch which comes into engagement with a first locking edge of the conveyable-article carrier in order to secure the conveyable-article carrier on the receiving element during movement along an upward slope, of the second conveying section, which exceeds a predetermined slope angle. Correspondingly, it is possible to provide a second locking notch which comes into engagement with a second locking edge of the conveyable-article carrier in order to secure the conveyable-article carrier on the receiving element during movement along a downward incline, of the second conveying section, which exceeds a predetermined angle of inclination.

Further advantages, expedient details and features of the invention can be gathered from the following description of an exemplary embodiment, with reference being made to FIGS. 1–5, in which:

BRIEF DESCRIPTION OF THE DRAWINGS

FIGS. 4a and 4b show a conveyable-article carrier engaged by a receiving element of the receiving conveyor as it travels along an upward slope and along a downward incline, respectively, of the second conveying section, it being the case that, in FIG. 4a, the engaged running roller of the conveyable-article carrier is indicated partially in a broken-away state and in section; and FIGS. 5a–5d show a front view, side view, rear view and plan view of the receiving element of the receiving conveyor.

DESCRIPTION OF THE PREFERRED EMBODIMENTS

Figure 1:
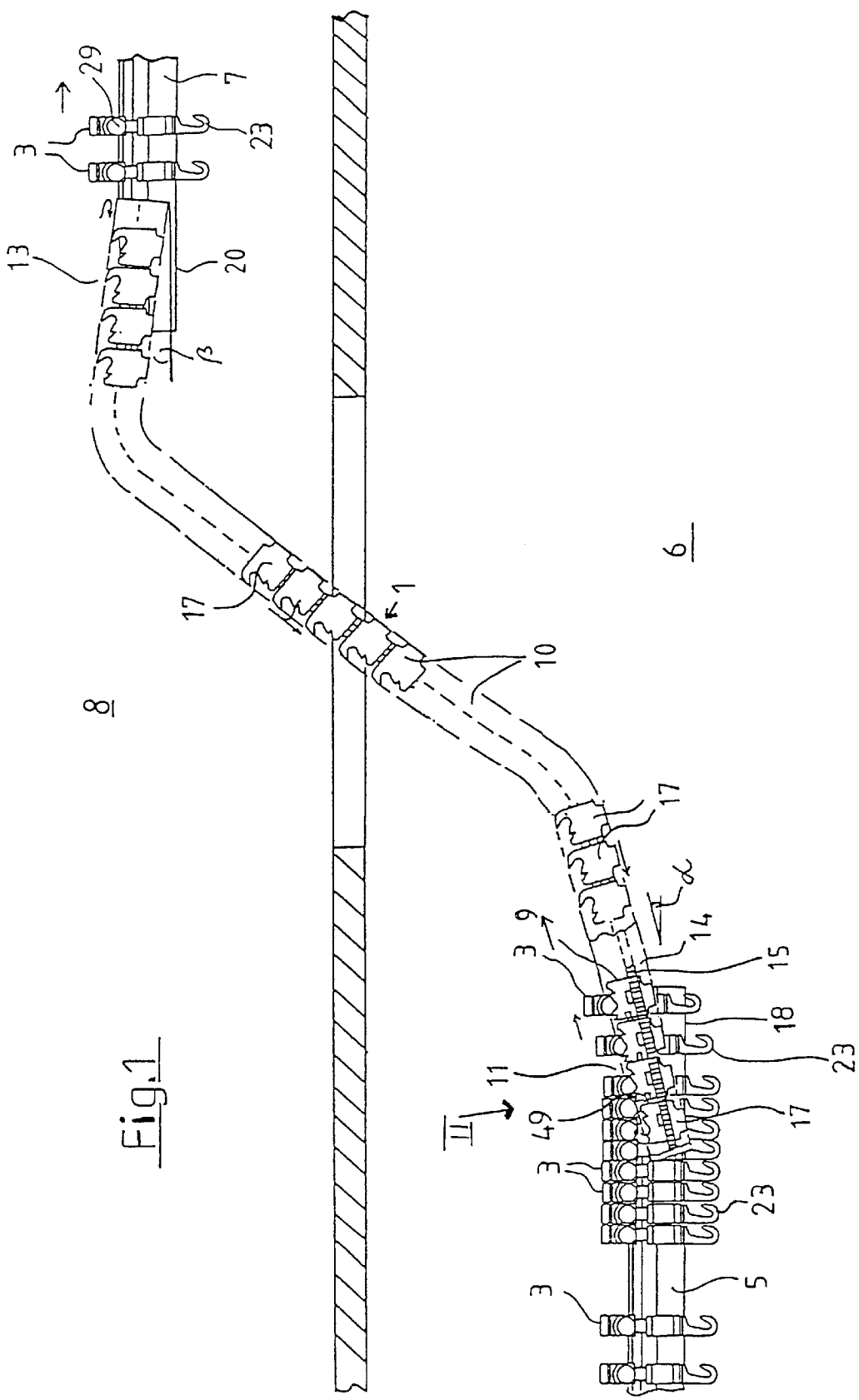
FIG. 1 shows a side view of a simplified, partially schematic illustration of a conveying apparatus according to the invention, the receiving conveyor, which is represented by a link belt, being used for transporting conveyable-article carriers, and possibly conveyable articles located thereon, from a bottom storey to a top storey.

FIG. 1 illustrates an advantageous possible use of a receiving conveyor 1 according to the invention, the receiving conveyor 1 transporting conveyable-article carriers 3 from one suspended conveyor, representing a first conveying section 5, in a bottom storey 6 along a second conveying section 9 to a second suspended conveyor, representing a third conveying section 7, in a top storey 8. For the sake of clarity, of the receiving conveyor 1, FIG. 1 shows merely a link belt 10, which is illustrated in a broken-away state at 14, forms a continuous loop and is deflected at a receiving head at 11 and at a transfer head at 13. Frame parts and fastening arrangements of the suspended conveyors and of the receiving conveyor are not depicted in FIG. 1. The link belt 10 comprises a drive chain 15, which is designed as an articulated chain (laterally curved chain), and receiving elements 17 for the conveyable-article carriers 3, the receiving elements 17 being fastened one after the other on relevant link plates of the drive chain 15. On account of its articulation play, the drive chain 15, which is constantly driven in circulation by a motor (not shown), can be articulated three-dimensionally to a limited extent, with the result that the chain-running path and thus the second conveying section 9 may have different upward slopes, downward inclines and curves, as is shown in FIG. 1. The drive chain 15 is guided, along its running path, in a chain-guide groove 19 (see FIGS. 2 and 3) which is formed in the frame 21 of the receiving conveyor 1, said frame being enclosed by the receiving elements 17. In the exemplary embodiment illustrated, the first and third conveying sections 5 and 7, respectively, are sections of respective conveying circuits with deflecting stations at 18 and 20.

In the exemplary embodiment, the conveyable-article carriers 3 are hanger carriers which, at their bottom end, have hooks 23 for hanging clothes hangers or the like. The clothes hangers and items of clothing possibly located thereon, are not illustrated in the figures. Of course, the conveying installation explained here is nevertheless designed for transporting hanger carriers 3 with or without conveyable articles suspended thereon.

For the purpose of explaining the construction of the hanger carriers 3, reference will be made first of all to FIG. 3.

Figure 3:
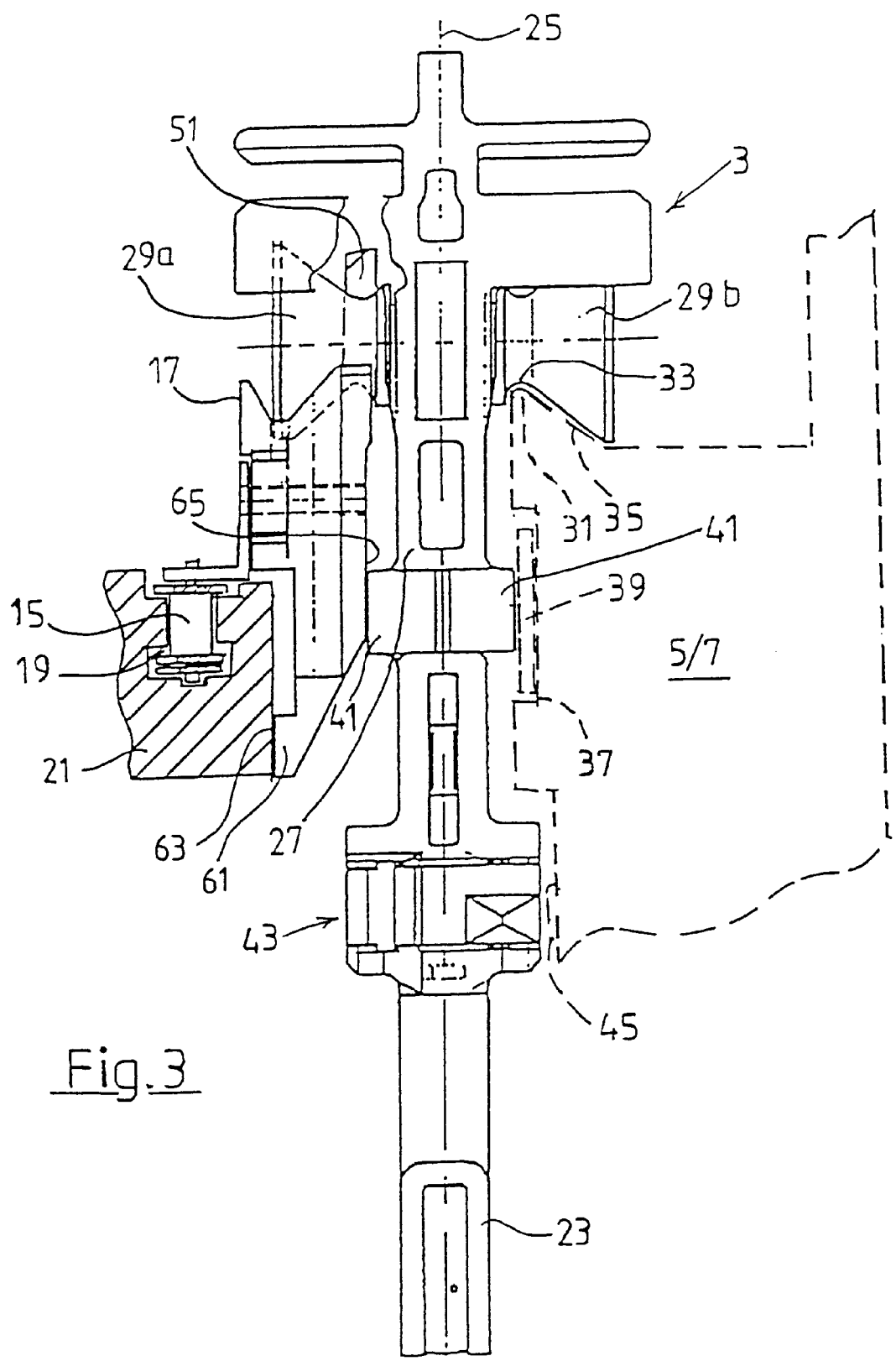
FIG. 3 shows a front view of a conveyable-article carrier engaged by a receiving element of the receiving conveyor, it being additionally indicated, for explanatory purposes, how such a conveyable-article carrier is normally guided on the running rail of a suspended conveyor.

FIG. 3 shows a front view of a hanger carrier 3 which is constructed essentially symmetrically in relation to the longitudinal center line 25 and is engaged by a receiving element 17 of the receiving conveying apparatus. The hanger carrier 3 has an elongate central part 27 which hangs down vertically in FIG. 3 and, at its bottom end, has the hook 23 for hanging a clothes hanger or the like. In the top region, running rollers 29a, 29b project laterally from the elongate central part 27 in a manner symmetrical in relation to the center line 25. The virtually frustoconical running rollers 29a, 29b are mounted on the elongate central part 27 such that they can be rotated via a common shaft.

The running rollers 29a, 29b usually serve for supporting the hanger carrier 3 on a running rail of a suspended conveying apparatus such that said carrier is suspended and can roll on its left-hand side or its right-hand side, as is partially illustrated in FIG. 1 at 5 and at 7. For explanatory purposes, the cross-sectional contour of a running rail of such a suspended conveying apparatus is indicated partially and schematically by dashed lines in FIG. 3 at 5/7. This is intended to illustrate how the hanger carrier 3 was guided on a relevant running rail of the first conveying section 5 before being received by the receiving conveyor 1 or is guided on a relevant running rail of the third conveying section 7 following transfer from the receiving conveyor 1. The running profile of the rail 5/7 has a point 31 which, in the situation indicated on the right-hand side of FIG. 3, engages in a groove 33 of the running roller 29b. The running-profile oblique surface 35, which adjoins the point 31, has a downward incline adapted to the oblique frustoconical contour of the running rollers 29, with the result that the running roller 29b, and thus the hanger carrier 3, is guided reliably on the running rail 5/7 for movement in the longitudinal direction of the running rail 5/7. Provided beneath the running surface 35, in the running rail 5/7, is a guide 37 in which there is received a frictional belt 39 of a frictional-belt drive, said belt being moved in the longitudinal direction of the rail. On the side directed towards the frictional belt 39, the hanger carrier 3 contains a conveying protrusion 41 which projects from the elongate central part 27, is provided with an outer frictional surface and butts against the frictional belt 39 when the hanger carrier 3 is suspended on the running path 35 of the rail 5/7 under the action of its own weight, the conveying protrusion 41 being forced into even closer contact with the frictional belt 39 by the weight of the conveyable article (not shown) hanging on the hook 23. With the hanger carrier 3 being carried along by the frictional belt 39 by frictional locking, the running roller 29b rolls with guidance on the running path 35 of the rail 5/7. Provided on the side of the center line 25 which is opposite from the conveying protrusion 41 is a corresponding conveying protrusion 41 which can pass into engagement with the frictional belt 39 in the same way if the hanger carrier 3 is rotated through 180° about its longitudinal axis and suspended on the running path 35 by way of its running roller 29a.

Provided for the purpose of disengaging the hanger carrier 3 from the frictional-belt drive at 39 is a spreading mechanism 43 which supports the hanger carrier 3 on the abutment surface 45 of the running rail 5/7 and, in the process, separates the conveying protrusion 41 from the frictional belt 39 by tilting the hanger carrier 3. In the case of a build-up of a group of hanger carriers 3, the spreading mechanism 43 is actuated by an engagement portion of an adjacent hanger carrier in front.

In the exemplary embodiment described, the receiving conveyor according to the invention is designed for automatically picking up, one after the other, hanger carriers 3 according to FIG. 1 from the running rail of the first conveying section 5 of the suspended conveying apparatus located in the bottom storey 6 and for setting said hanger carrier down on the running rail of the third conveying section 7 of the suspended conveying apparatus located in the top storey 8. The receiving conveyor 1 has a receiving head 11 with deflecting guides for the link belt 10 (see FIG. 2). At a receiving location 49, the receiving head 11 guides the receiving elements 17 up close to the running rail of the first conveying section 5 of the suspended conveying apparatus in the bottom storey 6, it being the case that the receiving head 11 guides the link belt 10 past the receiving location 49 at a slope angle α (see FIG. 1) relative to the essentially horizontal running rail of the first conveying section 5. If, then, a hanger carrier 3 is located on the running rail of the first conveying section 5 in the region of the receiving location 49, then it is engaged, at its running roller 29a directed away from the running rail, by a relevant receiving element 17 of the link belt 10 and, as the upwardly sloping movement of the receiving element 17 continues, is lifted out of the running-rail guide beyond the point 31 (see FIG. 3) of the running profile of the running rail of the first conveying section 5, the hanger carrier 3 being received on the receiving conveyor 1 for transportation to the top storey 8.

Figure 2:
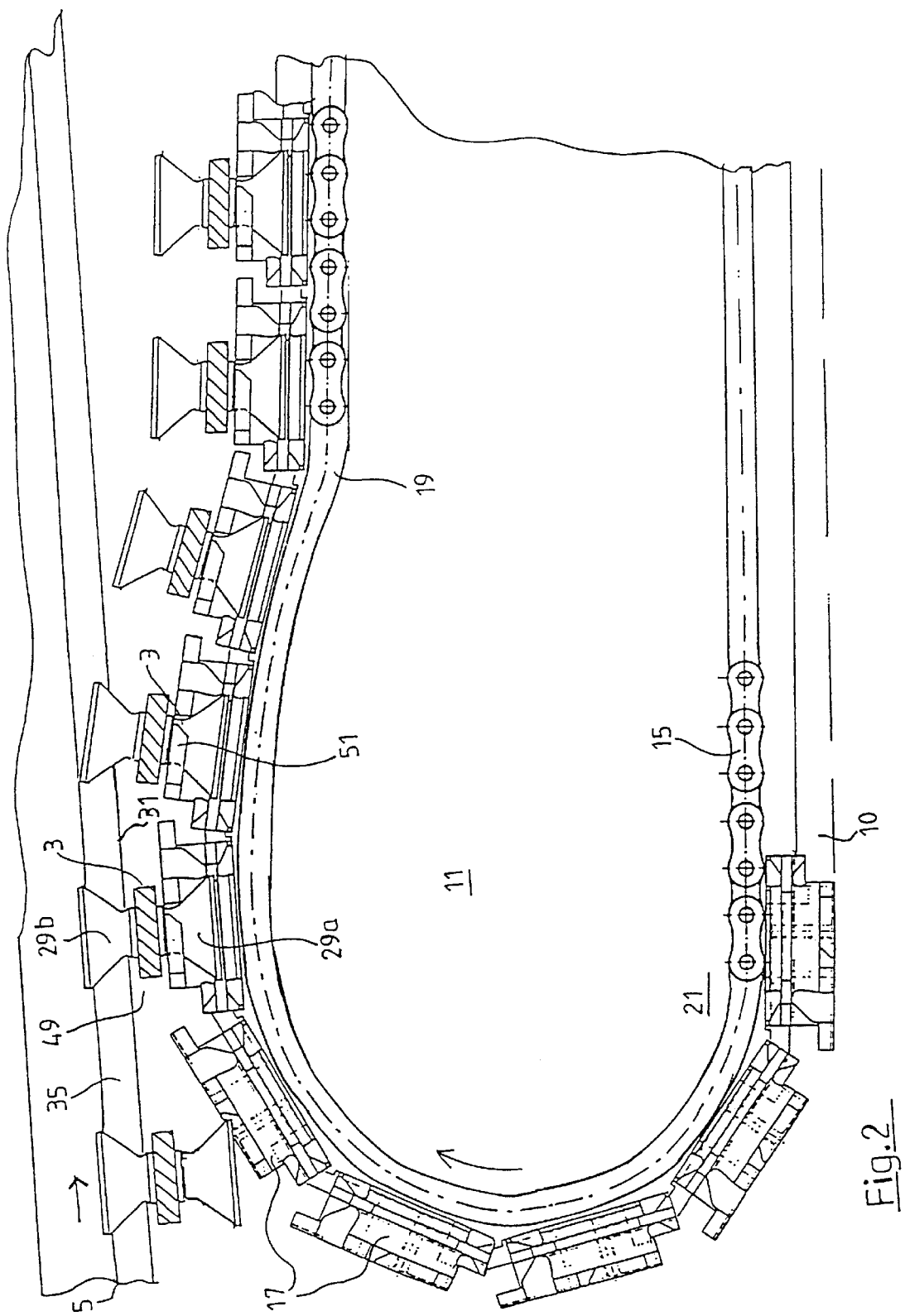
FIG. 2 shows a schematic partial illustration of a receiving head at the receiving location in a plan view with the viewing direction indicated at II in FIG. 1, the conveyable-article carriers being illustrated with a section above the running rollers.

Each receiving element 17 has a top hook portion 51 which, according to FIGS. 2, 3 and 4a, can grip behind the running roller 29a of a relevant hanger carrier 3 in the region of the running-roller groove 33 in order for the hanger carrier 3 to be lifted off reliably from the running rail of the first conveying section 5, and also for said hanger carrier to be retained securely in the direction of the top storey 8 in the region of the relatively pronounced upward slope of the transporting section 9.

As can be seen from the plan view of the receiving head 11 according to FIG. 2, the receiving elements 17 are guided away laterally from the running rail of the first conveying section 5 again after passing the receiving location 49. On account of the upward movement of the receiving elements 17, hanger carriers 3 received by the receiving elements 17 have already been lifted off from the running profile of the running rail to such an extent that, during this sideways movement, there is no collision between the running roller 29b, previously guided on the running rail, of the hanger carrier 3 and the running-rail profile. The receiving head 11 may be configured such that the lateral deflection of the receiving elements 17 away from the first conveying section 5 takes place to an even more pronounced extent than illustrated, with the result that the conveyable articles (not shown) suspended on the hooks 23 of the conveyable-article carriers are reliably guided laterally past the first conveying section 5, during the upward movement, without coming into contact with the running rail even when the receiving location 49, in contrast to FIG. 1, is not to be located directly at a deflecting station 18 of the first conveying section 5. This means that the receiving conveyor can be added to the first conveying section 5 at any desired location.

If required, the receiving head 11 may be pivoted about a virtually vertical pivot axis, by means of a pivot device (not shown), in relation to the running rail of the first conveying section 5 to such an extent that the receiving elements 17 cannot any longer come into engagement with hanger carriers 3 located on the running rail. The relevant hanger carriers 3 can then pass the receiving location 49, on the running rail of the first conveying section 5, without being influenced. After the receiving head 11 has been pivoted up to the running rail again in accordance with the situation shown in FIG. 2, hanger carriers 3 moving up on the running rail are then received by the receiving conveyor 1 again and thus discharged from the suspended conveying apparatus in the bottom storey 6. A controller diverter function may thus be realized by the receiving head 11 being pivoted back and forth. FIGS. 5a–5d illustrate, in a front view, side view, rear view and plan view, a plastic receiving element 17 in detail. The receiving element 17 has a pocket-like depression 55 which, for the purpose of stable mounting of a running roller 29, which is to be received therein, of a carried-along hanger carrier 3, has a shape adapted to the conical contour of the running roller 29. As a hanger carrier 3 is received, the relevant running roller 29 is guided in the pocket-like depression 55 via a receiving channel 57, the hook portion 51, which is located laterally in relation to, and above, the depression 55, grips behind the running roller at the groove 33 of the same (see preferably also FIGS. 3 and 4a). The receiving channel 57 likewise has an oblique surface 59, of which the contour is adapted to the conical downward slope of the running roller 29, which is to be guided in the receiving channel 57, of the hanger carrier 3. At the bottom end, the receiving element 17 has a supporting portion 61 by means of which it can be supported laterally on a peripheral surface 63 of the frame part 21 (see FIG. 3). This reliably avoids excessive tilting of the drive chain 15 in the chain-guide groove 19 even when hanger carriers 3, and thus the receiving element 17, is subjected to relatively pronounced loading by a heavy conveyable article. The supporting portion 61 may have, for example, a roller which rolls on the peripheral surface 63 of the frame part 21.

The hanger carrier 3 may be supported on a side surface 65 of the receiving element 17 by way of its conveying protrusion 41 directed toward the receiving element 17, as is shown in FIG. 3. This effectively damps oscillating movements of the hanger carrier 3 received by the receiving element 17. The receiving element 17 also has locking notches 67 and 69 which are intended for a hanger carrier 3 and run transversely to the movement direction of the receiving element 17.

The front locking notches 67 come into engagement with an edge portion 71 of an essentially arcuate roof web 73, which covers over the running roller 29 at the top, in order to lock the hanger carriers 3 securely on the receiving element 17 as soon as a certain slope angle (during rearward travel an angle of inclination) of the movement path of the receiving element 17 is exceeded.

The rear locking notches 69 come into engagement with the opposite edge portion 75 of the roof web 73 in the manner shown in FIG. 4b in order to secure the hanger carrier 3 on the receiving element 17 if, during downward travel, a certain angle of inclination between the receiving element 17 and hanger carrier 3 is exceeded. In the situation illustrated in FIG. 1, downward or rearward travel with hanger carrier does not take place. In other application cases of the receiving conveyor according to the invention, however, it is possible for the conveying section to have portions which are inclined downward to a pronounced extent or for the conveying direction to be reversed.

As can clearly be seen, in particular, from FIG. 5b, the receiving element 17 also has a tongue 77, which projects to the front, and an approximately complementary, rear recess 79. In the arrangement in the link belt 10, the front tongue 77 engages in the corresponding recess 79 of the adjacent receiving element 17 in the forward direction, and the rear recess 79 receives the tongue 77 of an adjacent receiving element 17 to the rear. The receiving elements 17 are thus interlinked via the interengaging tongues 77 and recesses 79 such that an irregular vertically offset arrangement between the receiving elements 17 in the link belt 10 is essentially avoided.

Taking into account the slope angle α (see FIG. 1) of the receiving head 11 relative to the running rail of the first conveying section 5 of the conveying apparatus in the bottom storey 6, the spacing of the receiving elements 17 on the link belt 10 is selected such that, at the set conveying speed, it is only ever one hanger carrier 3 (even in the case of build-up pressure of the hanger carriers 3) which is received by respective receiving elements 17.

In the case of the example, the hanger carriers 3 are received on the receiving conveyor 1 continuously at the same speed at which the hanger carriers 3 are moved on the running rail of the first conveying section 5. Irrespective of whether the hanger carriers on the running rail approach the receiving location 49 individually or in groups, each hanger carrier 3 is reliably received, and transported away, by the receiving conveyor according to the invention. Prior separation of the hanger carriers 3 on the running rail is not necessary for this purpose, with the result that, at a high conveying speed, it is possible to achieve a high conveying capacity.

A trial installation realized conveying and receiving speeds of 0.5 m/s during continuous operation.

The task of discharging the hanger carriers 3 from the receiving conveyor 1 onto the running rail of the suspended conveying apparatus located in the top storey 8 takes place in a manner which complements the abovedescribed task of receiving the same from the running rail of the suspended conveying apparatus located in the bottom storey 6. The discharging operation takes place via a transfer head, which is provided at 13 in FIG. 1 and is essentially constructed in the same way as the receiving head 11 shown in FIG. 2 and has a corresponding deflecting guide for the drive chain 15.

The transfer head at 13 in FIG. 1 is inclined downward to a slight extent at the angle of inclination β relative to the running rail of the top suspended conveying apparatus, with the result that the hanger carriers 3 carried along by the receiving elements 17 are positioned on the running profile of the running rail 7 from above by way of their running rollers 29 directed away from the receiving elements 17, the running roller 29 and the running profile of the running rail of the third conveying section 7 coming into engagement in the manner indicated at 31 and 35 in FIG. 3, with the result that the running rail receives the guide of the running roller 29 and the hanger carrier 3 is thus moved forward out of the receiving element 17 in order, finally, to be freed from the receiving conveyor 1.

It is possible to arrange, between the discharge head and the running rail 7, an introduction wedge (not shown) which comes into contact with that side of the hanger carrier 3 which is directed away from the running rail 7, in order to assist the lateral deflection thereof in relation to the running rail 7.

It should be emphasized that, for the use of the receiving conveyor according to the invention, it is not necessary for the hanger carriers 3 or the feeding and discharging suspended conveying apparatuses to be subjected to any changes or adaptation measures. The suspended conveying apparatuses and the hanger carriers may thus be of conventional construction. Furthermore, the receiving head may be fitted at any desired location along the running rail of a relevant suspended conveyor in order to receive conveyable-article carriers. The same applies to the transfer head for the transfer of conveyable-article carriers to a running rail of a suspended conveyor.

The receiving head and/or the transfer head are preferably provided with means (not shown) which load the end sides of the chain-deflecting guide in the outward direction in order to realize automatic chain tensioning. Furthermore, it is possible to provide sensors which register a chain breakage, a spring breakage of the chain-tensioning arrangement, excessive chain extension and/or excessive wear of the chain-guide groove in order to emit, if appropriate, a switch-off signal to a control arrangement of the receiving conveyor, said control arrangements then causing emergency switch-off of the receiving conveyor.

As an alternative to the application situation illustrated in FIG. 1, it is also possible for the receiving conveyor according to the invention, with corresponding conveying-section guidance, to be used for moving conveying means 3 between two or more suspended conveying apparatuses which are located, for example, in the same storey and have running rails located, if appropriate, in a common plane. In this case, both the receiving head and the transfer heads may optionally, and in a controlled manner, in each case be moved towards, or away from, a relevant suspended conveying apparatus in order to perform diverter functions in a controlled manner, with the result that extensive rearranging and sorting tasks may be performed. In this case, the receiving conveyor may be designed as an endless conveyor with a conveying direction which may optionally be changed over.

Since the conveying section of a receiving conveyor according to the invention may be configured virtually as desired, a large number of possible uses as a three-dimensionally movable conveyor are conceivable.

The receiving head and the transfer head may be configured symmetrically such that they can be fitted on relevant running rails of a suspended conveying installation, optionally flush with the left-hand side or right-hand side, for respectively receiving and transferring hanger carriers.

What is claimed is:

1. A conveying apparatus having a receiving conveyor for receiving conveyable-article carriers (3) from a suspended conveyor in which the conveyable-article carriers (3) are guided on a running-roller guide profile for movement along a first conveying section (5) and are supported in a suspended manner on own running rollers (29), which project from said conveyable-article carriers, wherein the receiving conveyor has a series of receiving elements (17) which are arranged one after the other on a common drawing means (15), the receiving elements are moved along a second conveying section (9) by the drawing means (15) and are intended for the conveyable-article carriers (3), it being the case that, at a receiving location (49), the first conveying section (5) and the second conveying section (9) run closely adjacent in a laterally offset manner, and the receiving elements (17) are guided such that, at the receiving location (49), they execute a lifting movement relative to the running-roller guide profile of the suspended conveying apparatus in order for the running rollers on the conveyable-article carriers (3), which are fed to the receiving location (49) along the first conveying section (5) from the suspended conveying apparatus in each case, to be engaged by the receiving elements (29), for the purpose of the conveyable-article carriers being carried along the second conveying section (9), and for said conveyable-article carriers to be lifted off from the guide profile of the suspended conveying apparatus.

2. The conveying apparatus as claimed in claim 1, wherein, at the receiving location (49), the second conveying section (9) has an upward slope with a slope angle (α) relative to the first conveying section (5), and wherein the receiving elements (17) each have a hook portion (51) by means of which they automatically grip behind and beneath the engagement means (29) of a conveyable-article carrier (3) respectively located at the receiving location (49) as they move along the upward slope of the second conveying section (9), in order to lift the conveyable-article carrier (3) off from the running-roller guide profile of the suspended conveying apparatus.

3. The conveying apparatus as claimed in claim 1, wherein the receiving elements (17) are guided such that they are deflected laterally immediately after passing the receiving location (49), their distance from the first conveying section (5) being increased in the process.

4. The conveying apparatus as claimed in claim 1, wherein each conveyable-article carrier (3) has a central carrier portion (27) from which in each case one running roller (29) of a running-roller pair projects on two mutually opposite sides, it being the case that a relevant conveyable-article carrier (3) in the suspended conveying apparatus is suspended laterally on the running-roller guide profile in each case by one of the two running rollers (29) and is guided on said running roller (29), and it being the case that the other running roller (29) serves as engagement means for the engagement by a relevant receiving element (17) of the receiving conveyor.

5. The conveying apparatus as claimed in claim 1, wherein the drawing means (15) is a drive belt which is designed as an endless loop, is driven in circulation around two deflecting devices, is guided along the second conveying section (9) and, on the loop periphery, has the receiving elements (17) for the conveyable-article carriers (3) in an endless series.

6. The conveying apparatus as claimed in claim 5, wherein the drive belt (15) is a chain, in particular articulated chain.

7. The conveying apparatus as claimed in claim 1, wherein the drawing means (15) can be driven for continuous movement, and wherein the movement sequence of the receiving elements (17) at the receiving location (49) and the geometry and spacing of the receiving elements (17) are coordinated with the conveying speed of the suspended conveyor such that each conveyable-article carrier (3) fed to the receiving location (49) on the suspended conveyor is engaged individually by a respective receiving element (17) of the receiving conveyor for the purpose of being carried along the second conveying section (9).

8. The conveying apparatus as claimed in claim 1, wherein, for the purpose of realizing a diverter function, the distance between the first conveying section (5) and the second conveying section (9) at the receiving location (49) can be changed in a controlled manner, with the result that the conveyable-article carriers (3) located on the first conveying section (5) can pass the transition location (49), and remain on the first conveying section (5), without being influenced by the receiving elements (17), which have been moved out of reach, if the distance between the conveying sections (5, 9) at the transition location (49) is increased by a certain value.

9. The conveying apparatus as claimed in claim 5, wherein the receiving conveyor has a receiving head (11) which has one of the deflecting devices for the drawing means (15) and which, in an active position, guides the receiving elements (17) up to the first conveying section (5) for the purpose of engaging conveyable-article carriers (3).

10. The conveying apparatus as claimed in claim 8, wherein, for the purpose of realizing a diverter function, the receiving head (11) can be moved, in particular pivoted, between the active position and a passive position relative to the suspended conveyor, it being the case that, in the passive position, it guides the receiving elements (17) out of reach of the conveyable-article carriers (3) moving on the first conveying section (5).

11. The conveying apparatus as claimed in claim 1, wherein, at a transfer location (13), the second conveying section (9) runs closely adjacent in a laterally offset manner to a third conveying section (7) which, corresponding to the first conveying section (5), has a running-roller guide profile for the conveyable-article carriers (3), and wherein the receiving elements (17) are guided such that, at the transfer location (13), they execute a lowering movement relative to the running-roller guide profile of the third conveying section (7) in order for conveyable-article carriers (3) which are received from the first conveying section (5) to be introduced into the running-roller guide profile of the third conveying section (7) from above by way of their free running rollers, which project outward from the receiving elements (17) in each case.

12. The conveying apparatus as claimed in claim 11, wherein, at the transfer location (13), the second conveying section (9) has a downard incline with an angle of inclination (β) relative to the third conveying section (7), it being the case that the conveyable-article carriers (3), which are fed to the transfer location (13) at the angle of inclination (β), are engaged at their free running rollers (29), which project outward from the receiving elements (17), by the running-roller guide profile of the third conveying section (7) such that they are forcibly freed from the receiving elements (17) and transferred to the third conveying section (7).

13. The conveying apparatus as claimed in claim 11, wherein the receiving elements (17) are guided such that they are deflected laterally immediately after passing the transfer location (13), their distance from the third conveying section (7) being increased in the process.

14. The conveying apparatus as claimed in claim 11, wherein, for the purpose of realizing a diverter function, the distance between the second conveying section (9) and the third conveying section (7) at the transfer location (13) can be changed in a controlled manner, with the result that the conveyable-article carriers (3) pass the transfer location, and remain on the second conveying section (9), without being affected by the running-roller guide profile of the third conveying section (7) if the distance between the second conveying section and the third conveying section at the transfer location is increased to a certain value.

15. The conveying apparatus as claimed in claim 11, wherein the receiving conveyor has a transfer head which guides the receiving elements (17) up to the third conveying section (7) and has a deflecting device for the drawing means (15).

16. The conveying apparatus as claimed in claim 15, wherein, for the purpose of realizing a diverter function, the transfer head can be moved, in particular pivoted, between its active position, in which it is advanced up to the third conveying section (7), and a passive position relative to the third conveying section (7), it being the case that, in the passive position, it guides the receiving elements (17) out of reach of the third conveying section (7), with the result that the conveyable-article carriers (3) can pass the transfer location (13), and remain on the second conveying section (9).

17. The conveying apparatus as claimed in claim 1, wherein the second conveying section (9) runs three-dimensionally.

18. The conveying apparatus as claimed in claim 1, wherein the receiving elements (17) each has a pocket-like depression (55) for receiving the relevant running roller (29) of a conveyable-article carrier (3), the pocket-like depression (55) having a contour adapted to the shape of the running roller (29).

19. The conveying apparatus as claimed in claim 18, wherein the receiving elements (17) each have a receiving channel (57) which introduces the running roller (29) into the pocket-like depression (55) as the relevant conveyable-article carrier (3) is received.

20. The conveying apparatus as claimed in claim 18, wherein the receiving element (17) has, laterally in relation to the pocket-like depression (55), an upwardly projecting hook portion (51) which is open in the forward direction and grips over a running roller (29) of a picked-up conveyable-article carrier (3), said running roller being received in the pocket-like depression (55).

21. The conveying apparatus as claimed in claim 1, wherein each receiving element (17) supports a respectively received conveyable-article carrier (3) at its running roller (29) such that it can be pivoted about the running-roller axis, with the result that the conveyable-article carrier (3) can be aligned vertically under the action of gravitational force when the receiving element (17), during movement along an upward slope or during movement along a downward incline of the second conveying section (9), is positioned obliquely relative to the vertical, it being the case that the receiving element (17) has a first locking notch (67) which comes into engagement with a first locking edge (71) of the conveyable-article carrier (3) in order to secure the conveyable-article carrier (3) on the receiving element (17) during movement along an upward slope, of the second conveying section (9), which exceeds a predetermined slope angle.

22. The conveying apparatus as claimed in claim 1, wherein each receiving element (17) supports a respectively received conveyable-article carrier (3) at its running roller (29) such that it can be pivoted about the running-roller axis, with the result that the conveyable-article carrier (3) can be aligned vertically under the action of gravitational force when the element (17), during movement along an upward slope or during movement along a downward incline of the second conveying section (9), is positioned obliquely, it being the case that the receiving element (17) has a second locking notch (69) which comes into engagement with a second locking edge (75) of the conveyable-article carrier (3) in order to secure the conveyable-article carrier (3) on the receiving element (17) during movement along a downward incline, of the second conveying section (9), which exceeds a predetermined angle of inclination.

* * * * *